(12) United States Patent
Mehrle et al.

(10) Patent No.: US 10,809,116 B2
(45) Date of Patent: Oct. 20, 2020

(54) LIGHT-GUIDING ELEMENT ARRANGEMENT FOR OPTICAL DROP DETECTION

(71) Applicant: VERMES MICRODISPENSING GMBH, Otterfing (DE)

(72) Inventors: Klaus Werner Mehrle, Otterfing (DE); Jiri Karger, Munich (DE)

(73) Assignee: VERMES MICRODISPENSING GMBH, Otterfing (DE)

( * ) Notice: Subject to any disclaimer, the term of this patent is extended or adjusted under 35 U.S.C. 154(b) by 193 days.

(21) Appl. No.: 15/765,587

(22) PCT Filed: Oct. 6, 2016

(86) PCT No.: PCT/EP2016/073850
§ 371 (c)(1),
(2) Date: Apr. 3, 2018

(87) PCT Pub. No.: WO2017/060335
PCT Pub. Date: Apr. 13, 2017

(65) Prior Publication Data
US 2018/0283928 A1    Oct. 4, 2018

(30) Foreign Application Priority Data

Oct. 9, 2015   (DE) .................. 10 2015 117 246

(51) Int. Cl.
*G01F 25/00*   (2006.01)
*G01F 11/00*   (2006.01)
(Continued)

(52) U.S. Cl.
CPC .......... *G01F 25/0092* (2013.01); *B41J 2/125* (2013.01); *G01F 11/00* (2013.01); *G01F 11/12* (2013.01);
(Continued)

(58) Field of Classification Search
CPC .. G01F 25/0092; G01F 25/0007; G01F 11/00; G01F 11/12; G01F 13/006; G01F 22/00; G01V 8/24; B41J 2/125
See application file for complete search history.

(56) References Cited

U.S. PATENT DOCUMENTS

| | | | |
|---|---|---|---|
| 4,255,754 A | 3/1981 | Crean et al. | |
| 4,260,882 A | 4/1981 | Barnes | |

(Continued)

FOREIGN PATENT DOCUMENTS

| | | | |
|---|---|---|---|
| DE | 10 2006 014 858 A1 | 12/2006 | |
| EP | 1 946 843 A1 | 7/2008 | |

(Continued)

OTHER PUBLICATIONS

International Search Report issued in PCT/EP2016/073850; dated Mar. 3, 2017.

(Continued)

*Primary Examiner* — Suman K Nath
(74) *Attorney, Agent, or Firm* — Studebaker & Brackett PC

(57) ABSTRACT

A drop-detection device detects a drop that escapes from a metering valve. The drop-detection device includes a light guide with first and second light-guiding elements that are arranged opposite each other at an intermediate space. A drop trajectory runs through the intermediate space such that a light beam sent out by the first light-guiding element crosses the drop trajectory and is subsequently coupled into the second light-guiding element. In addition, the drop-detection device includes a light-signal generation device that couples a pulsed light beam with a carrier frequency into the first light-guiding element. Furthermore, the drop-detection device also has a light evaluation device for evaluating the light beam coupled into the second light-guiding element (Continued)

Figure 1:
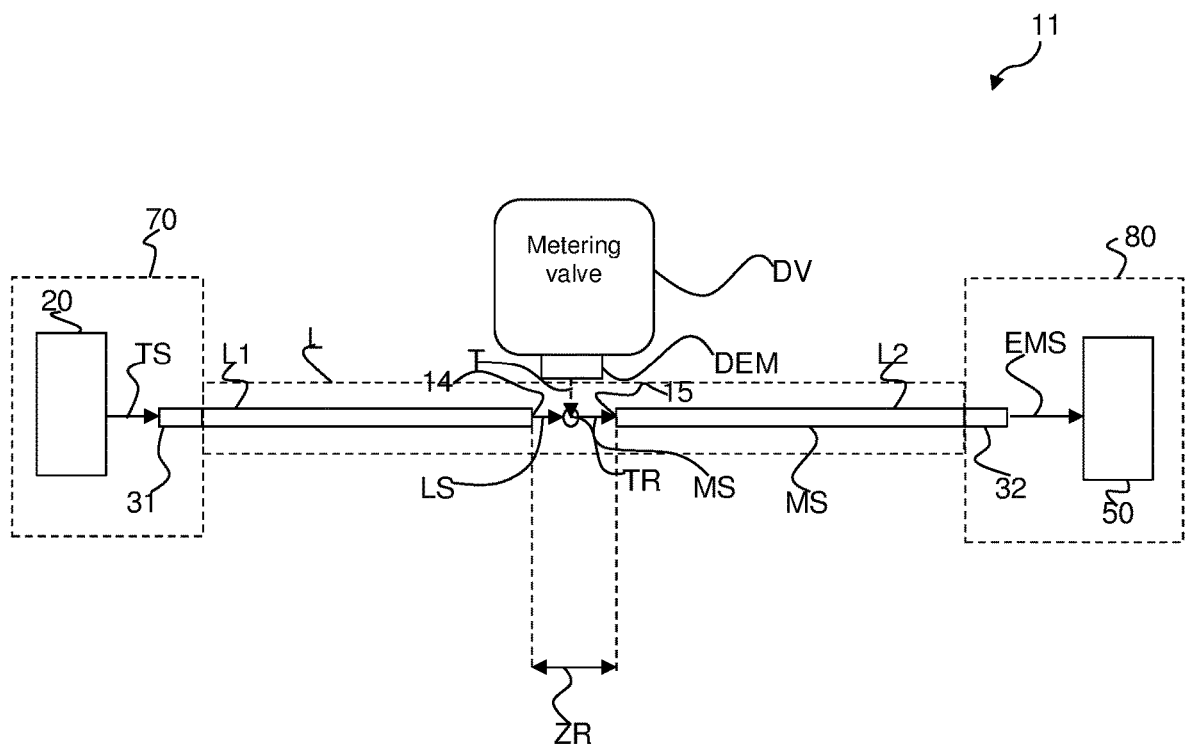

to determine if a drop has been dispensed by the metering valve. A method of detecting a drop is also described.

11 Claims, 8 Drawing Sheets

(51) Int. Cl.
    *B41J 2/125*     (2006.01)
    *G01F 22/00*     (2006.01)
    *G01F 11/12*     (2006.01)
    *G01F 13/00*     (2006.01)
    *G01V 8/24*     (2006.01)

(52) U.S. Cl.
    CPC ............ *G01F 13/006* (2013.01); *G01F 22/00* (2013.01); *G01F 25/0007* (2013.01); *G01V 8/24* (2013.01)

(56) References Cited

U.S. PATENT DOCUMENTS

| | | |
|---|---|---|
| 4,410,895 A | 10/1983 | Houston et al. |
| 4,577,197 A | 3/1986 | Crean et al. |
| 5,267,978 A | 12/1993 | Dirr |
| 5,275,787 A | 1/1994 | Yuguchi et al. |
| 5,650,609 A | 7/1997 | Mertins et al. |
| 9,541,528 B2 * | 1/2017 | Hossein-Zadeh ............ G01N 29/2418 |
| 2002/0089561 A1 | 7/2002 | Weitzel et al. |
| 2004/0149939 A1 | 8/2004 | Dickson et al. |
| 2006/0222109 A1 | 10/2006 | Watanabe et al. |
| 2006/0279601 A1 * | 12/2006 | Unosawa ................ B41J 2/125 347/19 |
| 2008/0184809 A1 | 8/2008 | Shvets et al. |
| 2011/0205283 A1 * | 8/2011 | Ito ........................ B41J 2/04561 347/19 |
| 2012/0225475 A1 | 9/2012 | Wagner et al. |
| 2013/0200277 A1 | 8/2013 | Li et al. |
| 2013/0252237 A1 | 9/2013 | Wagner |
| 2016/0282264 A1 | 9/2016 | Wagner |

FOREIGN PATENT DOCUMENTS

| | | |
|---|---|---|
| GB | 1 520 606 A | 8/1978 |
| WO | 99/21031 A1 | 4/1999 |
| WO | 2013/059835 A1 | 4/2013 |

OTHER PUBLICATIONS

International Search Report issued in PCT/EP2016/073851; dated Dec. 13, 2016.
Trivedi et al.; A modular approach for the generation, storage, Mixing, and detection of droplet libraries for high throughput screening; Lab on a Chip; 2010; vol. 10; pp. 2433-2442.

* cited by examiner

LIGHT-GUIDING ELEMENT ARRANGEMENT FOR OPTICAL DROP DETECTION

The invention relates to a drop-detection device for the detection of a drop escaping from a nozzle of a metering valve and moving along a trajectory. Beyond this, the invention relates to a method of detecting a drop, which escapes from a metering valve, preferably from a micro-metering valve.

When applying and dispensing liquid or pasty media, for example, for example adhesives, metering valves are used. A metering valve comprises a nozzle at the point where the fluid to be dosed is discharged. In the case of conventional needle valves, for metering a defined amount of media, the opening of the metering valve is released by slightly pulling the metering needle out of the valve seat. Thereby, the medium, for example, driven under pre-pressure, can flow through the nozzle opening or the valve opening. If the filling process or the metering process should be completed, the nozzle of the metering valve is closed.

In particular, based on the piezo-metering-valve technique, so-called jet valves can be set up. Hereby, the distribution of amounts of media takes place due to the back and forth movement of the metering needle and a valve tappet, wherein an amount of media is pushed out of the nozzle opening like a jet when a movement of the metering needle or the valve tappet in the direction of the nozzle opening occurs. This allows for the application of a defined amount of the metering medium also over greater distances between the metering valve and the application surface, for example, on a component to be processed. Thereby, the metering intervals may vary between half a millimetre and a few millimetres depending on the field of application. Jet valves allow for very fine metering to take place with a high level of speed without any contact to the component to be processed. In order to control the distribution of individual drops, sensors are required to detect the drops as well as corresponding evaluation processes.

In the case of optical detection of drops, which, in particular, have been generated by a jet valve beforehand, the following difficulties become evident: Initially, the smallest distance possible should be upheld between the metering valve and a surface where the drops are applied of a component to be processed. This distance may vary between 0.5 mm and 3 mm depending on the individual application. This specification considerably limits the possible construction height of a drop sensor. Furthermore, the drops to be detected, having diameters of sometimes less than 10 µm, are very small. Furthermore, the speed of the drops, having a velocity of up to 50 m/s, is very high, whereby this results in a very short transit time through a range monitored by a detecting sensor, thereby being several microseconds. The small size and high-speed of the drops require a weak sensor signal with a low signal amplitude and an unfavourable signal/noise ratio, which makes a fail-safe optical detection of a drop very difficult. If one tries to apply an optimal electric sensor, such as a photodetector for example, close to the nozzle of the valve in order to obtain the strongest optical signal and thereby, following the conversion thereof, electrical signal, conflict arises with the small dimensions of the system. For example, due to the lack of space, it is hardly possible to position the entire evaluation electronics directly on the sensor. However, if the evaluation electronics are arranged away from the sensors, there is the problem that the captured electric analogue signal must be transmitted to the evaluation electronics in a fail-safe manner. In the case of sensory measurement of drops, faults can originate from electromagnetic waves. For example, if the sensors are based on light-sensor technology, faults can be caused due to undesired light sources. The faults can, for example, occur due to daylight or light from any sort of illumination means.

In US 2002/0 089 561 A1, and apparatus for the detection of drops of a printing system is described, wherein light is guided by light-guiding elements and crosses a trajectory of a drop. The intensity of the light is reduced by the falling drops for a short period of time. The change in intensity as a function of time is recorded using sensors and used to detect the drops. However, the detection is susceptible to outer disturbances, such as scattered light, for example, so that a reliable drop detection is not always ensured.

In U.S. Pat. No. 4,255,754 A, a monitoring of the trajectory of ink drops of an inkjet printer are described. For monitoring, light is emitted, synchronised with the frequency of the drop generation, into the direction of the trajectory of an ink drop via a light-guiding element and captured with the aid of two light-guiding elements. A deviation of the ink drop from a predetermined trajectory is determined depending on the difference of the shadowing of the light, which is captured using both light-guiding elements. Even with this approach, faults may occur due to scattered light.

It is an object of the present invention to develop a sensor arrangement for metering valves that enables drop detection that is free of any faults to the furthest extent possible.

This task is solved by means of a drop-detection device as well as a method to detect a drop.

A drop-detection device according to the invention for the detection of drops that escape from a nozzle of a metering valve and move along a trajectory has a light-guiding element arrangement. The light-guiding element arrangement comprises a first light-guiding element and a second light-guiding element. These are arranged opposite each other in an intermediate space, which comprises the trajectory of the drop, in such a way that a light beam transmitted by the first light-guiding element crosses the trajectory of the drop and then is coupled into a second light-guiding element. Furthermore, the drop-detection device according to the invention has a light-signal generation device, which is configured to couple a light beam pulsed with the carrier frequency into a first light-guiding element. A pulsed light signal should be understood as a pulsed light beam with a carrier frequency, which periodically changes with continuous characteristic parameters (e.g. Frequency, also called the carrier frequency with a pulse frequency, amplitude), for example, being switched on and off at a certain rhythm. The signal initially does not carry any information with it in an unmodulated state except for the constant characteristic parameters. The information to be transmitted is first received by means of modulation which can be realized by a physical interaction of the carrier signal with an informational source. For example, a carrier signal can be modulated with the aid of the modulation signal or influenced by another physical disturbance, for example, a drop to be detected. In this connection, a change of the carrier signal with regard to one or a plurality of its parameters such as, for example, the amplitude, the frequency or the phase, should be understood as modulation. The pulse frequency or carrier frequency should be higher as the frequency of the modulation or the wavelength should be shorter than a "disturbance" of the signal caused by the drop.

The drop-detection device also comprises a light evaluation device, which is configured to evaluate the light beam coupled into the second light-guiding element in order to determine if a drop has been dispensed by the metering valve. In the case of a method to detect a drop according to the invention, which escapes from the metering valve, a light beam pulsed with a carrier frequency is emitted by a first light-guiding element in such a way that it runs through an intermediate space between the first light-guiding element and a second light-guiding element, crosses a trajectory of the drop, which runs through the intermediate space between the first light-guiding element in the second light-guiding element and then, is coupled into a second light-guiding element. Preferably, the pulsed light beam coupled into the second light-guiding element is evaluated in order to determine if a drop has been dispensed by the metering valve.

Due to the use of a pulsed light beam and its evaluation regarding the extent to which a "modulation" has occurred due to the drop, a relatively reliable detection of drops is possible without a relevant influence occurring due to scattered light or the like.

Other especially favourable embodiments and further embodiments of the invention result from the dependent claims as well as the following description, wherein the patent claims of a certain category can also be further developed according to the dependent claims of another category and features of various exemplary embodiments can be combined into new exemplary embodiments.

In an embodiment of the drop-detection device according to the invention, the first light-guiding element has a first and a second end. Thereby, the first end of the first light-guiding element is coupled with a light-emission device of the light-signal generation device. The second end of the first light-guiding element forms an emission window to the intermediate space to be monitored. The second light-guiding element also has a first and a second end, wherein the first end of the second light-guiding element forms a detection window to the intermediate space to be monitored and the second end of the second light-guiding element is coupled with a sensor device of the light evaluation device. The emission window of the first light-guiding element in the detection window of the second light-guiding element can, in the simplest case, be formed by the front surfaces of the ends cut with conventional cutting means for glass fibres. For this purpose, the fibre ends can be cut using a cutting means provided for this and then possibly slightly polished. Thereby, the emission windows of the light-guiding elements can be manufactured with a low level of effort. For this, no additional options are required. If such an emission window is damaged or dirty, the damage can be eliminated easily by cutting a piece of the light-guiding element and then possibly still polishing it. Thereby, it must be ensured that the windows surfaces and the edges of the ends of the light-guiding elements are as level as possible and are orientated perpendicular to the longitudinal axis of the light-guiding elements.

In a preferred embodiment of the drop-detection device, the first and second light-guiding elements are arranged on the metering valve in such a way that the pulsed beam of light from the first light-guiding element hits a drop which may have been dispensed by the metering valve directly and is influenced in some way physically by the drop, preferably modulated, and directly coupled into the second light-guiding element. "Directly" in this context means that, preferably, before the emission window of the first light-guiding element before the detection window of the second light-guiding element, no secondary optics such as lens systems or the like are used. The first and the second light-guiding element are, for example directly arranged opposite each other and aligned flush with one another. Thereby, the emission window of the first light-guiding element and the detection window of the second light-guiding element are facing each other so that a light beam emitted by the emission window of the first light-guiding element falls on the detection window of the second light-guiding element. Furthermore, both light-guiding elements as well as the trajectory of a drop possibly dispensed by the metering valve are preferably at a single level so that a light beam emitted by the first light-guiding element hits the drop, is modulated by this and then falls on the detection window of the second light-guiding element, from which it is coupled into the second light-guiding element. For example, the light beam that is possibly affected, meaning modulated by the drop, is led further, after coupling into a second light-guiding element, from this into a sensor device with which the possibly modulated light beam is initially converted into a modulated electrical signal for evaluation.

The first light-guiding element in the second light-guiding element of the drop-detection device according to the invention can, for example, comprise plastic fibres. Preferably, the light-guiding elements comprise POF light guides (POF=Plastic Optical Fibre=polymer optical fibre).

In an especially effective embodiment of the drop-detection device according to the invention, the first light-guiding element and the second light-guiding element have a core diameter at a range of 0.1 mm to 3 mm, preferably from 0.5 mm to 1.5 mm, even more preferably from 0.9 to 1.1 mm.

In an embodiment of the drop-detection device according to the invention, the light-guiding elements are positioned relative to the metering valve in such a way that, depending on the respective metering process, in particular, depending on a drop size to be expected, a defined effective cross-section surface of the first and/or second light-guiding element is chosen. Effective cross-section surface of a light-guiding element is to be understood as the part of the cross-section surface of the light-guiding element which is available for the detection of the drop or the emission of the light beam. For example, a part of the light-guiding element cross-section of a nozzle adjusting nut of the metering valve can be covered so that it does not contribute to the effective cross-section surface.

In particular, the signal to noise ratio can be optimised or a maximum transit time of the drop can be achieved by adapting the effective cross-section surface(s) of one or both light-guiding elements to the respective metering process or the drop size to be expected.

For example, the effective surface of the light-guiding elements can comprise the entire surface of the light-guiding element surface. That means the light-guiding elements are positioned relative to the metering valve in such a way that no part of the cross-section surface of the light-guiding elements is, for example, covered by the nozzle adjusting nut of the metering valve. Thereby, the entire active height of the light-guiding element is utilised. A maximum transit time of the drop through the modulation unit is associated with this. This is beneficial for drop detection since more sampled signal values can be acquired. For logical reasons, as much of the light modulated by the drops as possible should be coupled into a second light-guiding element so that the value of the amplitude of the measurement signal recorded by the sensor system is as big as possible, thereby achieving a sufficient signal-to-noise ratio. In an alternative embodiment of the drop-detection device according to the invention, the effective surface of the light-guiding elements comprises only half of the entire surface of the light-guiding element surface. That means the light-guiding elements are positioned relative to the metering valve in such a way that the upper half of the cross-section surface of the light-guiding elements is, for example, covered by the nozzle adjusting nut of the metering valve. Thereby, only half of the height of the light-guiding element is still utilised for detection. In relation to using the entire height, only half as long as the transit time of the drop is associated with this. Such an arrangement normally represents a good compromise between a transit time of the drop being as long as possible and the required installation space and thereby the minimum distance of the metering valve to the workpiece to be processed resulting therefrom. In order to set the desired effective light-guiding element surface, spacers can be applied between the light-guiding element holder and the metering valve.

In another embodiment of the drop-detection device according to the invention, the effective surface of the light-guiding elements comprises only a fraction of the entire light-guiding element surface. That means the utilised light-guiding element surface only comprises a fraction of the entire light-guiding element surface. Such an arrangement can, for example, in the case of very small drops, be advantageous since there is a more favourable ratio between active surface and a surface shadowed by the drop. This results in a stronger signal amplitude modulation signal, which contributes to an improved signal-to-noise ratio.

It is especially preferred if the light-emission device of the drop-detection device according to the invention is configured to convert a pulsed electrical signal into a light wave without changing the carrier frequency in-phase of the pulsed signal to a relevant extent. Since, in the case of evaluating the detected signal, it is also preferred to take the phase position of the pulsed signal into consideration, a greater change of the phase of the pulsed signal would affect the evaluation of the detected signal during the emission of the light beam by the light-emission device. The optical path, meaning especially the signal conversion of the signal from an electrical signal into a light signal and back again into an electrical signal between the light-emission device in the sensor device, causes a certain-phase shift. However, this is rather low in relation to the preferably used carrier frequencies. Furthermore, in advance, meaning before the actual drop detection, a training phase is carried out, in which the perfect phase shift between the carrier signal and the control signals of the demodulation unit is set for sideband selection. Hereby, this can be considered a slight phase shift resulting from the electro-optical signal conversion.

In a variation of the drop-detection device according to the invention, the light-signal generation device is designed in such a way that the brightness of the pulsed light beam is set by choosing the level of the parameter value of the pulse width of the light pulse of the pulsed light beam. If, for example, a duty cycle with a comparatively small pulsed width or short pulse duration relative to the duration of the signal or the pulsed light beam is chosen, the brightness of the pulsed light beam is thereby reduced. Conversely, the brightness of the pulsed light beam can be increased due to a duty cycle with a comparatively wide pulse width or long pulse duration relative to the period duration of the signal or the pulsed light beam. In optimum brightness to be set refers to the upper electric sensor, meaning the residual light reaching the photodiode, meaning the light which still remains after the entire optical path, thereby hitting the photodiode.

The intensity of the emitted light and also the residual light thereby received must be chosen in such a way that the sensor is at its maximum level of sensitivity at this operating point. Sensitivity thereby refers to a maximum possible fluctuation of the output current of the photodiode resulting from a slight variance in light intensity. The setting should be adjusted when replacing the light-guiding element.

The drop-detection device according to the invention preferably has a signal-generation unit that can preferably be part of the light-signal-generation device. This signal-generation device is preferably configured to generate an electric carrier signal with the defined pulse frequency or carrier frequency. Based on this electrical carrier signal, the pulsed light beam is then generated.

Moreover, the drop-detection device according to the invention preferably has an evaluation unit which can be part of the light evaluation device. The evaluation unit is configured to determine if a drop has been dispensed by the metering valve based on the modulated measurement signal taking the defined pulse frequency or carrier frequency into consideration. Preferably, for this purpose, within a demodulation unit, which, for example can be part of the evaluation unit, a modulation signal based on the modulated signal can be determined taking the defined pulse frequency or carrier frequency under consideration and, based upon the modulation signal, it is then determined if a drop has been dispensed by the metering valve. In this connection, a signal corresponding to the modulation of the carrier signal due to the drop should be understood as a modulation signal, which can be "separated" again from the carrier signal by means of demodulation.

Certain signal parameter values of the modulated measurement signal or of the modulation signal, such as, for example, the course of the curve of the temporal dependency of amplitude and phase of the modulation signal corresponds to certain characteristics or dimensions of a drop to be detected. The relationship between the aforementioned signal parameters and the characteristics or dimensions of a drop to be detected must not be directly known for the detection. It is sufficient if it is defined in advance, for example, within a training procedure with the aid of "sample drops" with defined dimensions, which signal parameter values of the modulated measurement signal or the modulation signal indicates a drop with the desired characteristics and dimensions (the "sample drops" used within the training procedure), meaning when a drop is deemed to be detected.

In an embodiment of the drop-detection device, dispensing a drop is checked within a defined window of time, which is synchronised with the drop dispensing control system of the metering valve. In other words, a time window, in which a drop is detected or generally, when a drop is searched for or, if applicable, a carrier signal is generally emitted, is synchronised with a drop dispensing of the metering valve in such a way that the provided drop dispensing takes place within a time window.

In a special embodiment, the drop-detection device comprises a demodulation unit that is configured to carry out an amplitude modulation of the measurement signal.

In an especially effective embodiment, a quadrature modulation of the measurement signal is carried out in order to determine an in-phase component and a quadrature component. For this purpose, the demodulation unit can be configured accordingly.

Preferably, the amount of amplitude and/or the phase of the modulation signal based on the modulated measurement signal can be determined on the basis of the in-phase component and the quadrature component. For example, amplitude and phase of the modulation signal can be acquired by means of polar-coordinate transformation of the in-phase component and the quadrature component. To do this, the evaluation unit of the drop-detection device can preferably have a modulation valuation unit, which is configured for this.

In a special variation of the drop-detection device, this, in particular, the modulation valuation unit is configured to determine amplitude derivative values, comprehensively the time derivative, comprising the time derivative of the amplitude value and/or phase derivative values, comprising the time derivative of the phase of the modulation signal.

In a preferred embodiment, the drop-detection device, in particular, the modulation valuation unit is configured to combine a predetermined number of amplitudes derivative values into amplitude comparative values and/or in a predefined fixed time interval of the time window and/or, in a second predetermined time interval of the time window, to combine a predetermined number of the phase derivative values into the phase comparative values. For example, the combination of the amplitude derivative values and the phase derivative values can comprise a summation or adding of a plurality of amplitudes derivative values into amplitude comparative values and a summation or a summation or addition of a plurality of phase derivative values into phase comparative values.

In principle, the two time intervals for the combination of the amplitude derivative values and the combination of the phase derivative values are determined during the training phase or during the aforementioned training procedure. Thereby, during the training of the time intervals, values are continuously acquired without any time restrictions. The time intervals are determined in such a way that a defined number of maximum values for the amplitude derivative values and the phase derivative values can be acquired at these time intervals. The time intervals for the amplitude derivation values and the phase derivative values are preferably determined independently of one another. That means, its time duration and its start time are independent from each other.

For example, a time interval can be set in such a way that it comprises 50 measurement values, if the number of maximum values, 10 for example, within such a large range. After specifying this range, after the training phase, the 10 maximum values from these 50 measurement values comprising a time interval are always determined or searched for and further used.

Based on the amplitude comparative values and/or the phase comparative values, it can preferably be determined if the modulation signal indicates a drop. Therefore, in addition to the modulation valuation unit, the evaluation device of the drop-detection device according to the invention preferably comprises a detection filter unit that is configured to determine if the modulation signal indicates a drop based on the amplitude comparative values and/or the phase comparative values.

In order to detect a drop, in particular, the detection filter unit of the drop-detection device can be configured to determine a deviation of a amplitude comparative value, for example, determined by the modulation valuation unit, from an amplitude reference value and/or a deviation of a phase comparative value determined, for example, by the modulation valuation unit, from a phase reference value. An amplitude reference value can be formed, for example, from a plurality of amplitude comparative values of previously collected modulation signals. A phase reference value can be formed, for example, by a plurality of phase comparative values of previously collected modulation signals. When forming the reference values, it should be ensured that only comparative values which have been classified as correctly detected drops are part of the determination of the reference values.

In a special embodiment, the drop-detection device can have a reference value storage device, in which an amplitude reference value, which is formed from a plurality of amplitude comparative values from previously recorded modulation signals, and/or a phase reference value, which is formed from a plurality of phase comparative values from previously recorded modulation signals, are saved as variable reference values. From this, a continuous adaptation of the reference values in the case of a slow global average fluctuation of the comparative values results with reference to the comparative values of an individual drop. With relation to the comparison of the comparative values with an absolute factor, by means of this, the permitted fluctuation ranges with reference to the reference values can be reduced.

In order to determine if a drop has been detected, the drop-detection device, particularly the detection filter unit is configured to determine if the detected deviation of the amplitude comparative value from the amplitude reference value and/or the detected deviation of the phase comparative value from the phase reference value do not exceed a maximum value. In other words, the reference values form a target value, which is calculated from empirical values for example. The reference values are acquired during the normal detection process on a continual basis. They represent a type of target value in connection with the relative permitted variances determined from the filter training phases. The permitted relative variances represent empirical factors since they are determined during the filter training. If the determined comparative values are too far away from the target value, this concludes that either no drop or at least no regular drop was detected.

In an especially preferred variation, it is determined if the amplitude reference value used to determine the deviation of the amplitude comparative value is within a predetermined amplitude reference value range and/or if the phase reference value used to determine the deviation of the phase comparative value is within a predetermined phase reference value range. For this purpose, in turn, the detection filter unit can be configured accordingly. For example, within a reference value storage device, a fixed reference value range for the amplitude and phase reference values can be respectively stored. Such a fixed reference value range can, for example, be determined within a training phase, in which a possible fluctuation range of a reference value is also measured. If the reference value used is not within the fixed reference value range, it is assumed that, primarily non-regular drops have contributed to determining the reference value in such a way that such a reference value is no longer deemed reliable. For example, in such a case, an investigative result can be classified as being at least unreliable or be disregarded. Such a situation can occur when the dimensions of the drops dispensed by a metering valve change slowly, but continuously. Now, if a reference value is formed based on such altered modulation values or comparative values, in an unfavourable case, a reference value may also correspond to a non-correct drop, which deviates too much from a predetermined target drop. In order to avoid such an error, it is preferred to determine a fixed interval for the reverence values, away from which this is not allowed to deviate. If it is determined that the reference value is no longer within the predetermined interval, a notification to the user of the drop-detection device can be, for example, given, entailing that the system is no longer properly calibrated. The user can then take counter-measures. For example, the user can check to ensure that the metering valve is functioning properly and eliminate any functional faults. Then, for example, after restarting the system, correct reference values can be determined. The reference values in this case are determined after restarting in a type of preparatory phase and updated during the measurement process by forming averages of the current measurement values with the reference values up to that point.

Figure 2:
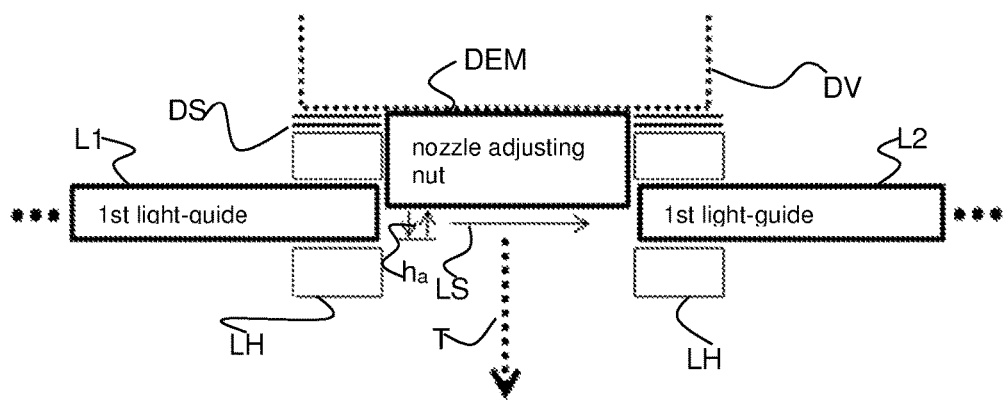
Figure 2:
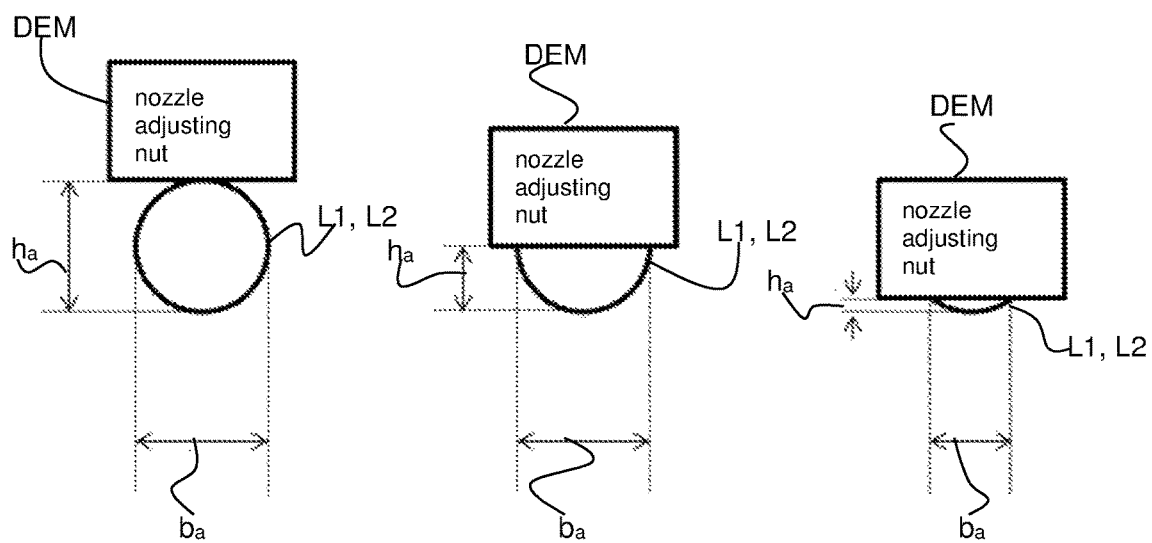
Figure 3:
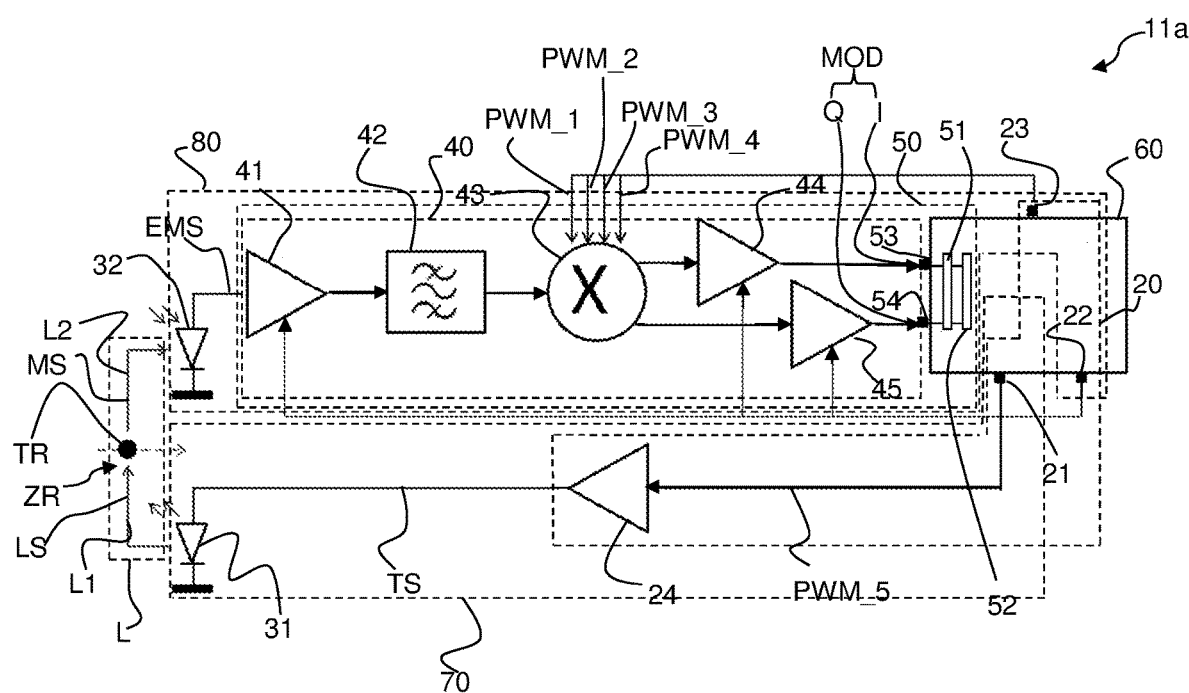
Figure 4:
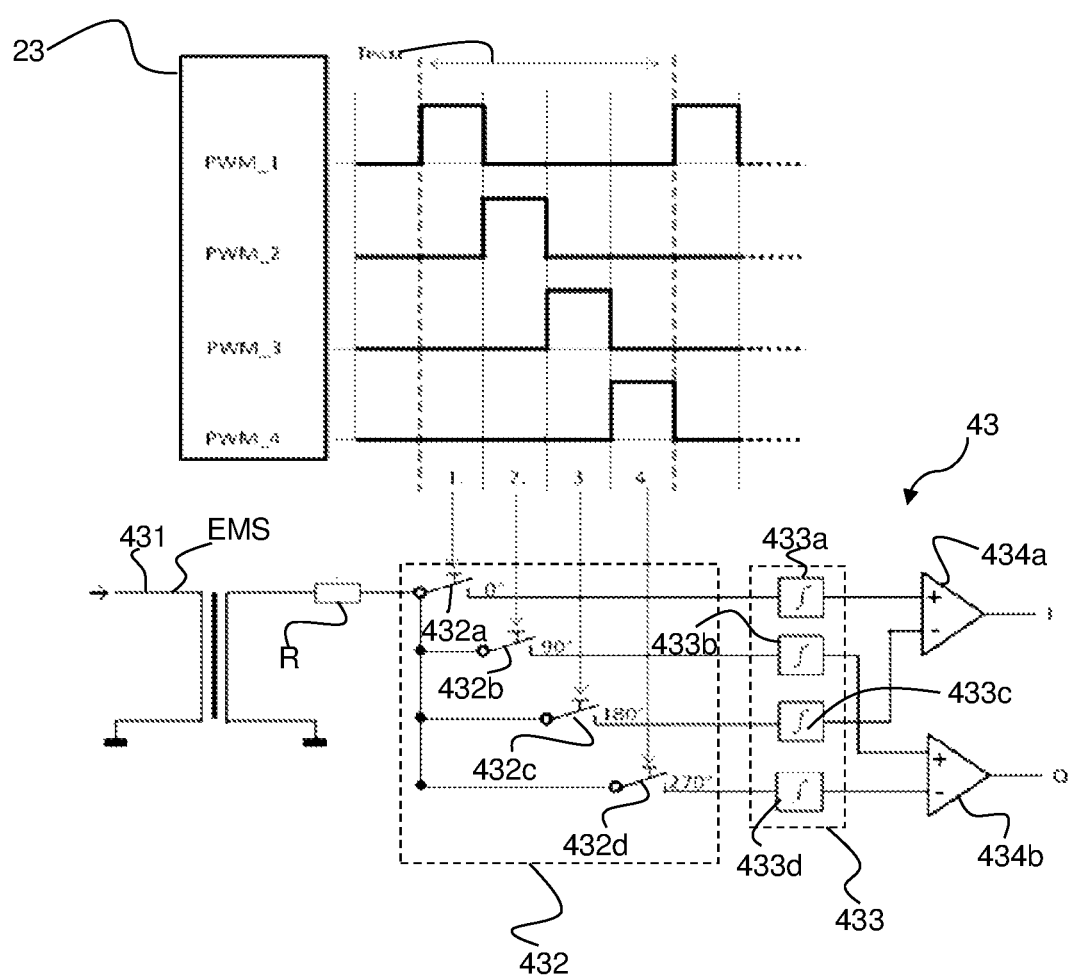
Figure 5:
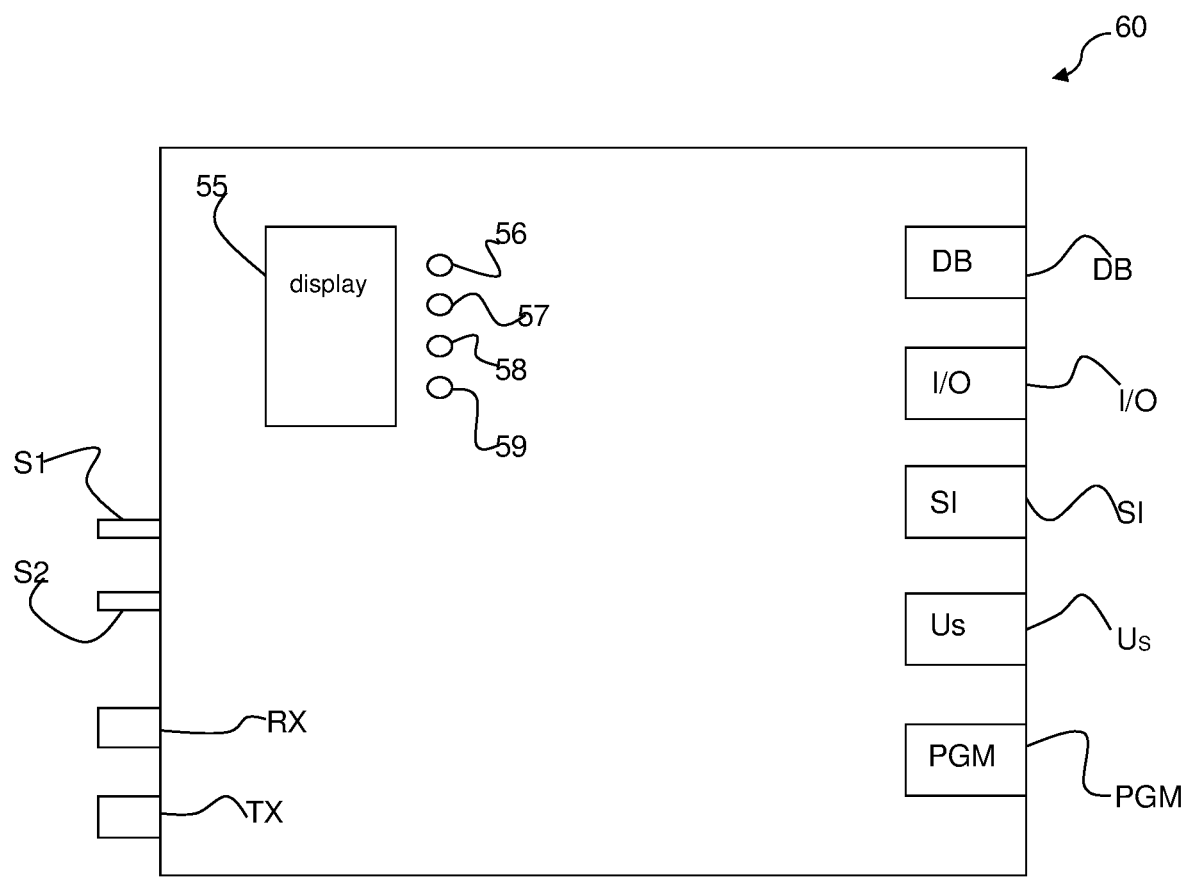

The invention is explained once again below with reference to the enclosed figures on the basis of exemplary embodiments. Thereby, identical components in the various figures are provided with identical reference numbers. The figures are generally not to scale. The figures show:

FIG. 1 is a schematic representation of a drop-detection device according to an exemplary embodiment of the invention, FIG. 2 a cross-sectional view of a drop-detection device according to the invention as well as a plurality of variations with different active light-guiding element heights, FIG. 3 is a detailed representation of a drop-detection device according to an exemplary embodiment of the invention, FIG. 4 is a detailed representation of a mixer unit of a demodulation unit of a drop-detection device in accordance with an exemplary embodiment of the invention, FIG. 5 a schematic representation of a control unit of a drop-detection device according to an exemplary embodiment of the invention.

Figure 6:
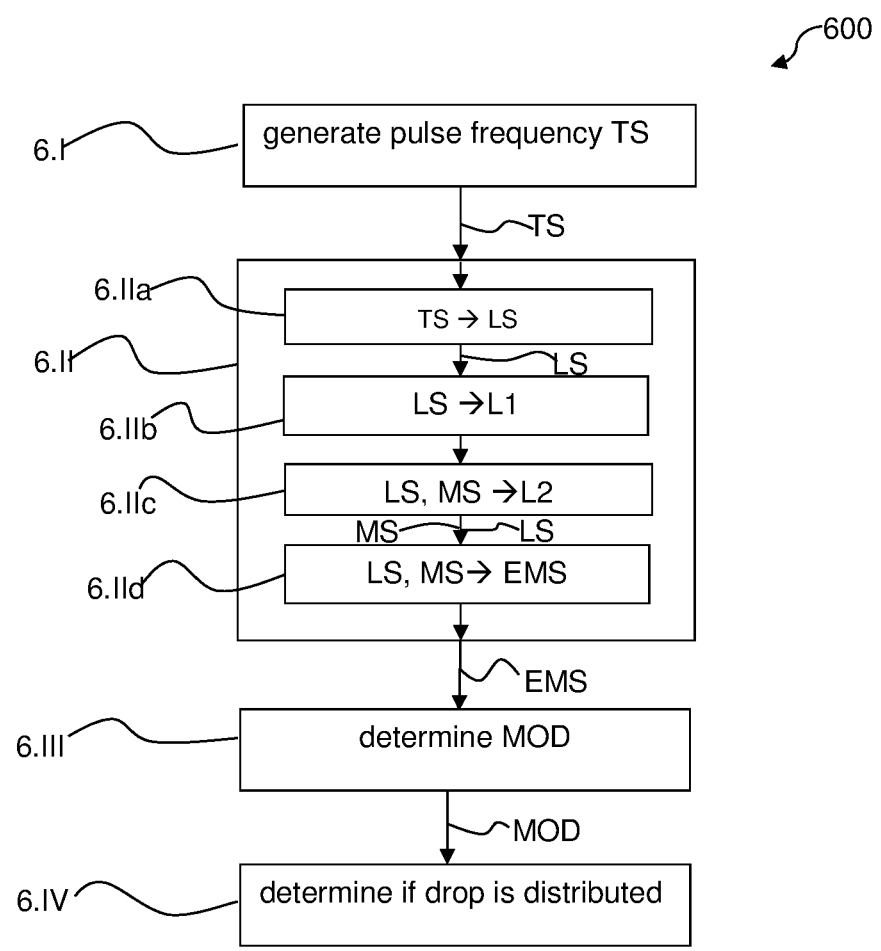
Figure 7:
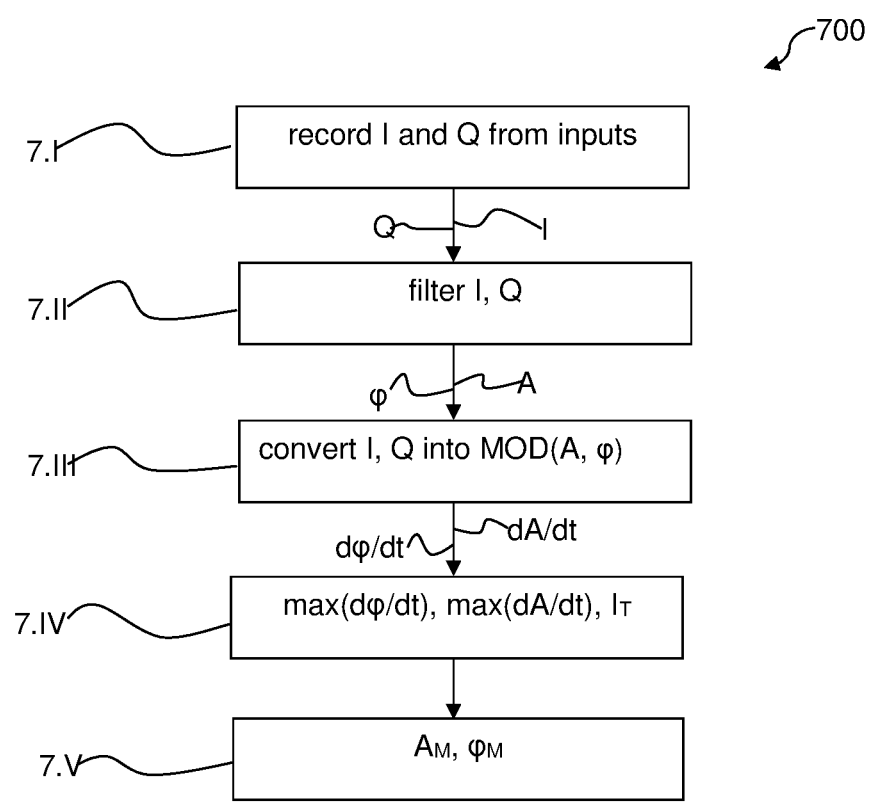
Figure 8:
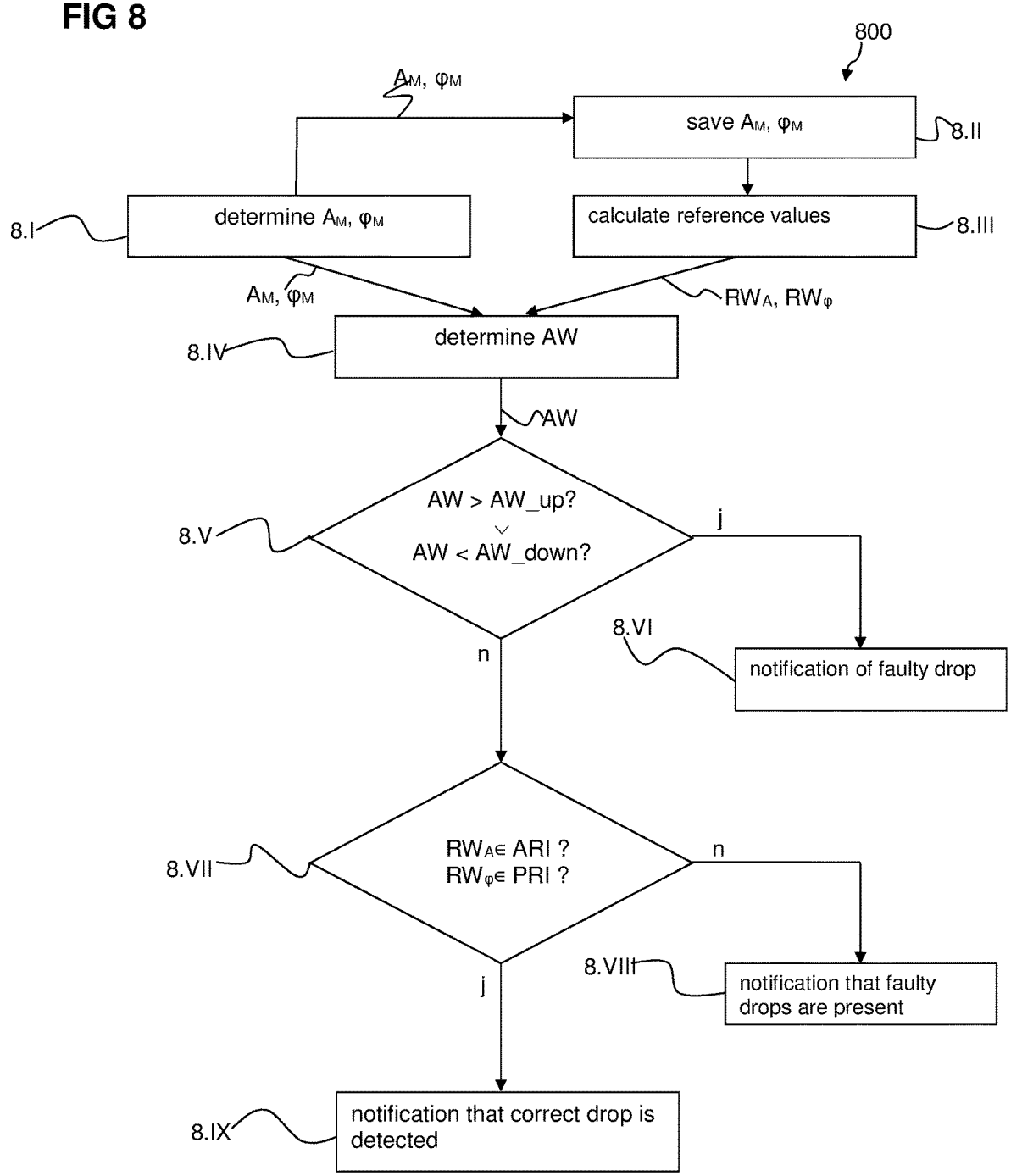

FIG. 6 a flowchart, with which a method to detect a drop is illustrated,

FIG. 7 a flow chart, with which the functional principle of the modulation valuation unit shown in FIG. 3 is illustrated, FIG. 8 a flow chart, with which the functional principle of the detection filter unit shown in FIG. 3 is illustrated in detail.

In FIG. 1, a drop-detection device 11 according to an exemplary embodiment of the invention is shown. In the exemplary embodiment shown in FIG. 1, the drop-detection device 11 comprises a light-signal-generation device 70, a light-guiding element arrangement L and a light evaluation device 80. The light-signal-generation device 70 comprises a signal-generation unit 20, which generates a pulsed electrical carrier signal TS. The electrical carrier signal TS is transmitted to a light-emission unit 31, for example a light diode, which converts the electrical signal TS into a light beam LS pulsed with the carrier signal TS. The pulsed light LS generated by the light-emission unit 31 is transmitted to the light-guiding element arrangement. In the exemplary embodiment shown in FIG. 1, a first light-guiding element L1 of the light-guiding element arrangement is connected to the light-emission unit 31 in such a way, that the light beam LS emitted by the light-emission unit 31 is directly coupled into the first light-guiding element L1 of the light-guiding element arrangement L.

With the aid the first light-guiding element L1, the pulsed light beam LS is supplied to the intermediate space ZR through an emission window 14, in which a trajectory T of a drop TR emitted by a metering valve DV (with a nozzle adjusting nut DEM). The light of the light beam LS is modulated by the drop TR in such a way that it then comprises information corresponding to a modulated light signal MS. Then, the light beam LS comprising the modulated light signal MS is coupled into a second light-guiding element L2 out to via a detection window 15.

The light beam LS comprising the modulated light signal MS is transmitted to a light evaluation device 80 by the second light-guiding element L2. The light evaluation device 80 comprises a light sensor 32 and a signal evaluation device 50.

Since the drop-detection device 11, in particular due to the use of the pulsed light beam, is very sensitive to scattered light and other disturbances, however extremely sensitive to the useful signal, it is favourably not required to use additional optical elements, such as lens systems or the like, at the emission window 14 of the first light-guiding element L1 or at the detection window 15 of the second light-guiding element L2. The exit and entry sides of the light-guiding elements must be level and vertical to the longitudinal axis of the light-guiding elements. Since the light sensor 32 in the light-emission unit 31 are located outside of operating range of the metering valve DV, this sensor 32 and the emitter 31 can be dimensioned independently of the confined space conditions that are predominant within the range of the nozzle adjusting nut DEM of the metering valve DV. The emitter 31 serves as a signal converter, which converts the unmodulated electrical carrier signal into an unmodulated light signal LS. The light sensor 32 serves as a signal converter, which converts the modulated light signal MS in a modulated electrical measuring signal EMS.

The subsequent processing of the modulated electrical measurement signal EMS is described in more detail in relation to FIGS. 3, 6 and 7.

In FIG. 2, in the upper detailed drawing, a cross-section of a drop-detection device according to an exemplary embodiment of the invention is shown. Furthermore, in FIG. 2 in the lower detailed drawing, a plurality of variations of the arrangement of the light-guiding elements L1, L2 are illustrated with different active light-guiding element heights $h_a$. The arrangement of the light-guiding elements L1, L2 are determined with the aid of distance spacers DS, that are attached between a light-guiding element holder LH and the metering valve DV. In the case shown in the upper detailed drawing, the active height beyond the nozzle adjusting nut DEM of the metering valve is approximately half of the light-guiding element diameter, which, in the case of a light-guiding element diameter of 1 mm, corresponds to an effective height $h_a$ of 500 µm. The height of the section of the light-guiding elements L1, L2 should be understood as an active height, which is open toward the intermediate space, in which the trajectory T of the drop runs. That means that the section is the part of the cross-section of the light-guiding elements L1, L2 which is not covered by the nozzle adjusting nut DEM of the metering valve DV. However, this height can be adapted to the respective circumstances, which are determined by the respective metering process by means of approximately 100-µm thick distance spacers.

In the lower detailed drawing, three variations of the arrangement of the light-guiding elements L1, L2 are shown with different active light-guiding element heights $h_a$. In the detailed drawing on the left, the entire light-guiding element surface is used, meaning the active height $h_a$ corresponds to the diameter of the light-guiding elements L1, L2. By means of this, a long transit time of the drop is achieved due to the detection range between both light-guiding elements L1, L2. This is beneficial for drop detection since more sampled signal values can be acquired.

In the lower middle detailed drawing, half of the light-guiding element surface is used, meaning the active height $h_a$ corresponds to half of the diameter of the light-guiding elements L1, L2. The active width $b_a$ of the light-guiding elements corresponds to the diameter of the light-guiding elements L1, L2. Although, in the case of this variation, the transit time of the drop is somewhat shorter due to the detection range between both light-guiding elements L1, L2, however this variation represents a good compromise between the required installation space, meaning the minimum distance to the workpiece that the drop is being applied to and the achieved transit time.

In the lower right partial drawing, only a fraction of the entire light-guiding element surface is used. Such an arrangement can, for example, in the case of very small drops, be advantageous since, in the case of this variation, there is a more favourable ratio between active surface and a surface shadowed by the drop. This results in a stronger signal amplitude modulation signal, which contributes to an improved signal-to noise ratio.

In FIG. 3, a drop-detection device 11a in accordance with an especially preferred exemplary embodiment of the invention is shown. The drop-detection device 11a also comprises the units shown in FIG. 1, such as a light-signal generation device 70, a light-guiding element arrangement L and a light evaluation unit 80 which is marked with a dotted line in FIG. 3. The light-signal generation device 70 as well as the light evaluation device 80 are shown in detail in FIG. 3. The light-signal generation device 70 comprises, as shown in the light-signal generation device in FIG. 1, a signal-generation unit 20, which is been drawn into FIG. 1 using a dotted line. In this exemplary embodiment, the signal-generation unit 20 comprises a transmission signal-generation unit 21, which generates a transmission signal PWM_5 with a defined specifiable pulse frequency, for example, as a pulsed square wave signal. The generated transmission signal PWM_5 is transmitted to a power amplifier of 24, which amplifies the transmission signal PWM_5 to a carrier signal TS. In addition, the signal-generation unit 20 comprises a signal-generation unit 23, which is configured to transmit pulsed control signals PWM_1, . . . , PWM_4, which are phase-shifted with relation to the carrier signal, to a mixer unit 43 of a demodulation unit 40. The signal-generation unit 23, is part of the signal-generation unit 20, however, it serves to evaluate a detected modulated signal EMS and is therefore not part of the light-signal generation device 70, but considered a part of the light evaluation device 80.

Furthermore, the signal-generation unit 20 has a control signal output 22 to control amplifier switches 44, 45 of the light evaluation device 80, which are also not part of the light-signal generation device 70 but deemed to be part of the light evaluation device 80 since the control signal generated by the control signal output 22 serves to evaluate the modulated signal MS.

The pulse frequency of the control signals PWM_1, . . . , PWM_4 for the mixer 43 is always equal to the frequency of the transmission signal PWM_5. The phase shift between the control signals PWM_1, . . . , PWM_4 and the transmission signal is variable. The pulse frequency is preferably 450 kHz+−15 kHz. The determination of the frequency of the carrier signal serves to ensure that the received signal (the carrier signal and sidebands resulting from the amplitude modulation caused by the drop) can optimally run through the bandpass filter.

By the setting of the phase position between the carrier signal and the control signals of the demodulation unit, a sideband is then selected. The carrier frequency must be higher than two times the frequency resulting from the drop transit time through the modulation unit 30 in accordance with the sampling theorem.

The carrier signal TS generated by the transmission signal-generation unit 21 is transmitted by the amplifier 24 to a light-emission unit 31. The light-emission unit 31 may be, for example, a light-emitting diode, which lights up TS according to the carrier signal TS adjacent to the LED. In other words, the carrier signal, which is initially occurs as pulsed electrical current, is converted into a pulsed light signal. The light-emission unit 31 is connected to the light-guiding element arrangement L. In detail, the light-emission unit 31 emits the pulsed light signal TS into a first light-guiding element L one of the light-guiding element arrangement L1, which supplies the pulsed light signal TS to an intermediate space ZR, in which a trajectory of a drop TR to be detected of a metering valve (see FIG. 1) runs. A second light-guiding element L2 to is arranged opposite the first light-guiding element L1, as has been already explained in association with FIG. 1.

The light-guiding element L2 is connected to the light evaluation device 80, which is also marked with dashes in FIG. 3. The light evaluation device 80 comprises a sensor unit 32 which records a light signal modulated by the drop TR, provided that a drop has been dispensed. The sensor unit 32 comprises, for example, a photodetector, which receives the modulated light signal MS and converts it again into an electrically modulated signal EMS that can be transported by an electrical line.

The electrical modulated signal EMS is then transmitted to an evaluation unit 50 (also marked with a dotted line in FIG. 3), which is part of the light evaluation unit 80 and also has a demodulation unit 40. The demodulation unit 40 comprises an amplifier unit 41, which amplifies the modulated electrical signals. The amplifier unit 41 is controlled via a control signal output 22 of the signal-generation unit 20 and, on the one hand, serves to pre-amplify the modulated signal EMS detected by the photodetector 32 and, on the other hand, as a transimpedance amplifier. Thereby, the photo detector 32 is pretensioned in the blocking direction and operated in a quasi-short-circuit. By means of this, only the emission of a linear current from the photodetector 32 depending on the lighting strength across many factors without voltage fluctuation still takes place. By means of this, the bandwidth of the detector, which is normally limited due to the terminal capacitance, is considerably higher since no reversal of the capacitance takes place. Due to the pretensioning, in addition, a further reduction of the capacitance is achieved with which another increase in the achievable bandwidth goes hand in hand. In addition, a transfer of the power signal takes place into a voltage signal due to the transimpedance amplifier. The amplification factor of this implementation is adjustable. By means of this, a maximum voltage-driven signal modulation is achieved, which is dependent on the drop shadowing.

Furthermore, the demodulation unit 40 comprises a filter unit 42. The filter unit 42 can, for example, comprise a bandpass filter, which only lets through both sidebands and the carrier frequency of the modulated signal EMS. The filter unit 42 furthermore removes possible disruptive signals caused by an external light incidents with frequencies far away from the pulse frequency of the carrier signal TS. In addition, the filter unit 42, preferably a deep-edged bandpass filter, also removes the harmonic waves generated by the pulse width modulation. The modulated measurement signal EMS filtered in this way is then sent onto a mixer 43, which mixes the modulated and filtered measurement signal EMS with the pulsed control signals PWM_1, . . . , PWM_4, hereinafter also referred to as PWM signals, which are phase-shifted with relation to the carrier signal and generated by the second signal-generation unit 23 and an in-phase signal or an in-phase component I is transmitted to an in-phase signal amplifier 44 and a quadrature signal or a quadrature component Q is transmitted to a quadrature signal amplifier 45. The in-phase signal amplifier 44 and the quadrature signal amplifier 45 are controlled by a control signal output 22 of the signal-generation unit 20. The amplifiers 41, 44, 45 are controlled separately from each other. They are set via a varying resistor (rheostat) that can be programmed via a data bus (e.g. 120 bus). Thereby, each rheostat (and thus amplifier) is adjusted individually. Thereby, the setting of the amplifier 41 with regard to the value is completely independent of the amplifiers 44 and 45. However, the amplifiers 44 and 45 always have the same value in order not to change the relation between the I and the Q signal. However, also these are controlled separately from each other. The function of the mixer unit 43 is explained in FIG. 4 in detail and will be explained in further detail later on. The in-phase component I and the quadrature component of Q form the modulation signal MOD.

After the amplification of both signal components I, Q has taken place within the amplifiers 44, 45, within the evaluation unit 50, both components I, Q are transferred to the subunits of the evaluation unit 50, which are part of a control unit 60 in the exemplary embodiment shown in FIG. 2. The control unit 60 comprises corresponding inputs 53, 54 for the signal components I, Q. The A-D converters (not shown), which convert the analogue signal components I, Q into digital signals, are connected downstream from the inputs 53, 54. The amplifiers 44, 45 of the demodulation unit 40 can be adjusted with regard to their amplification factor and serve to increase the signal components I, Q of the modulation signal MOD generated by the mixer unit 43 to an optimal voltage level for the A-D converter. This ensures maximum utilisation of converter resolution. In order not to take the A-D converters to their voltage limit specified by a reference voltage due to their steady components available in the components I, Q, only the alternating parts caused by a drop will be amplified.

Furthermore, the evaluation unit 50 includes a modulation valuation unit 51 and a detection filter unit 52. These subunits of the evaluation unit 50 are part of the control unit 60 shown in FIG. 2. In the modulation valuation unit 51, the digitised signal components I, Q are mathematically prepared and transformed into amplitude and phase information, for example, with the aid of a polar-coordinate transformation process. The detection filter unit 52, for example can be designed as a parametrizable filter, with which, using the collected information, it can be determined whether a drop has passed through the intermediate space ZR between the first light-guiding element L1 and the second light-guiding element L2. Before the system 11a begins regular operation, it must be set by two ongoing initialization operations that are separate from one another.

On the one hand all hardware assemblies must be set on a working point that is optimal for detection. These settings comprise the determination of the operating point of the light sensor 32 by the carrier signal duty cycle, the frequency tuning of the carrier signal TS on the filter characteristic of the bandpass filter 42, the setting of the phase position of the mixer signals PWM_1 . . . PWM_4 in relation to the carrier signal to the exact sideband selection, the determination of the optimal amplification factor of the transimpedance amplifier 41 and signal adapting of the I and Q signals to the A-D converter of inputs 53, 54 by the A-D preamplifier 44, 45. On the other hand, all parameters of the detection filter unit 52 are adjusted with reference to the target drops to be expected TR. This comprises the time window for searching for the derivative maxima for the amplitude and phase values, the permitted relative variances of the comparative values of the reference values of the amplitude and phase values as well as the permitted absolute ranges of the reference values of the amplitude and phase values. Both the hardware and the filter settings can be set manually or by automatic training processes. These settings are required for the acquiring the modulation value, as well as the signal evaluation with regard to the detection of a drop of TR.

In FIG. 4, a mixer unit 43, in this embodiment a quadrature modulator, is shown in detail. The quadrature demodulator 43 comprises a transmitter 431, a switch unit 432 with parallel switches 432a, 432, 432 c, 432d, an integrator unit 433 with parallel switches 432a, 432, 432c, 432d, each with downstream integrators 433a, 433b, 433c, 433d, as well as a first and a second differential amplifier 434a, 434b, which are each electrically connected to two integrators. The quadrature demodulator 43 acts as a single-sideband mixer and again sets the electrical modulated measurement signal EMS back into the baseband. The sideband used for the modulation is selected by a passing choice of the phase position of the modulated measurement signal EMS with relation to for control signals PWM_1, . . . , PWM_4, which control the switches 432a, 432b, 432c, 432d of the mixer 43 via the differential amplifiers 434a, 434b, which are connected downstream from integrators 433a, 433b, 433c, 433d. As output signals of the differential amplifiers 434a, 434 (b), in-phase signals I and quadrature signals Q are generated, from which a modulation signal MOD can be derived, which is correlated with the disturbance of the carrier signal TS by a drop TR of the metering valve.

In particular, the mixer unit 43 works as follows: A measurement signal EMS is transferred from the transmitter 431 to the input of the mixer unit 43. The transmitter 431 serves to adapt the performance between various components as well as to balance signals and remove existing offsets. Furthermore, the mixer 43 comprises a resistor R which is connected in series to the output of the transmitter and forms a filter together with the integrators 433a, 433b, 433c, 433d. Control signals PWM_1, . . . , PWM_4 are applied to the switches 432a, 432b, 432c, 432d and incremented by the signal-generation unit 23, which interconnect one of the switches 432a, 432b, 432c, 432d for a fourth of the period $T_{PWM}$ or a quarter wave of the carrier signal TS. The control signals PWM_1, . . . , PWM_4 are synchronised with the carrier signal TS. If one of the switches 432a, 432b, 432c, 432d is closed, the measurement signal EMS for the time interval, in which the respective switch 432a, 432b, 432c, 432d is closed, is integrated into an average value by the assigned integrator 433a, 433b, 433c, 433d. The integrators 433a, 433b, 433c, 433d can, for example, comprise parallelly connected capacitors and generate average values of the sections of the modulated electrical measurement signal EMS assigned to the individual quarter waves of the carrier signal TS. An average value integrated into the first quarter wave is at the positive input of the first differentiator 434a marked with a "+" and an average value integrated into the third quarter wave is at the negative input of the first differentiator 434a marked with an "−". An average value integrated into the second quarter wave is at the positive input of the first differentiator 434b and an average value integrated into the fourth quarter wave is at the negative input of the second differentiator 434b marked with an "−". In-phase signal I in the baseband is generated at the output of the first differentiator 434a and a quadrature signal in the baseband is generated at the output of the second differentiator. Details about the functionality of such mixed units are described in U.S. Pat. No. 6,230,000 B1

In FIG. 5, an outer view (a housing) of the control means 60 is shown, with which the control system of individual units of a drop-detection device 11, 11a, the evaluation of measurement signals, the monitoring of the functionality of individual units and the settings and tuning of individual system parameters can be carried out. In this case, all of the electronics are accommodated within this housing. In principle, this concerns the whole drop-detection system including the optoelectronic signal converter (receiver photodiode 32, and transmission LED 31). These represent the border of the "optical range", meaning to the transmission light-guiding element L1, to the emission window and to the drop path T, which is located externally.

In future, the data-bus connection DB should, among other things, serve to communicate with the valve control unit. For example, the current status of drop detection or also statistics on the past metering processes (number of detected errors and when these occurred) can be transmitted to this via the data-bus connection DB. Another optional application for this data-bus connection DB entails the drop-detection system being able to prompt the valve control unit to make intentional wrong doses in order to check if the drop detection is functioning properly. The drop detection must then detect these intentional incorrect doses. Part of the control means 60 also includes a communication interface I/O, with which trigger signals from the valve control unit 70 are received and, via which, information on the system status of the drop-detection device in the metering status is indicated.

Furthermore, the control means 60 comprises a serial interface SI, which serves as a connection to a higher-level process control computer 80. The process control computer 80 can control the drop detection via the serial interface SI and/or request status reports on the past doses.

The control means 60 has an input RX, which serves as a connection of the receiving light-guiding element L2 to the photo element. The receiver light-guiding element L2 is connected to the RX input. An output TX serves a connection of the transmission light-guiding element L1 to the transmission light-emitting diode 31. The transmission light-guiding element L1 is connected to the output TX.

Another input $U_S$ serves to supply control means 60 with power. An additional input PGM can be used as a programming socket for transferring firmware.

Beyond this, the control means 60 comprises a display 55 as well as a plurality of control indicator lights 56, . . . , 59. A first indicator light 56 serves to display various system errors. A second control light indicator 57 serves to display the system status and an activity of the system. This status can, for example, concern circumstances in which a light-guiding element L1, L2 is not connected properly, damaged, too long or dirty. A third control light indicator 58 can include a notification that a drop with correct dosage was detected. A fourth control light indicator 59 can comprise a notification that a metering error has occurred, meaning, for example, that no drop has been detected or the detected drop deviates from the target drop too much.

Furthermore, the control means 60 comprises two pressure switches S1 and S2 to coordinate the individual units of a drop-detection device. For example, by pressing the one switch S1 for a defined span of time (here, for example, 2 sec.), a first training mode, a "hardware training mode" is activated, in which, for example, the settings of a pulse width of the carrier signal TS occur so that an optimum brightness of the light-emission unit 31 with relation to the residual light reaching the light sensor unit of a light beam formed based on the carrier signal TS is reached, the determination of a frequency of the pulse carrier signal TS occurs so that both sidebands of the modulated signal EMS can pass through a filter unit 42 connected downstream from the sensor device occurs, setting the phase position of the carrier signal TS via the signal PWM_5 in relation to the control signals PWM_1, . . . , PWM_4, with which the mixer unit 43 belonging to the demodulation unit is controlled, and the setting of the amplifier units 44 and 45 occurs to adjust voltage and the amplifier unit 41, which acts as a transimpedance amplifier. The hardware training mode is, for example carried out during a first commissioning of the drop-detection device or if hardware components have been replaced.

By pressing the other switch S2 for a defined span of time (also, for example, 2 sec.) a second training mode, namely a "software training mode" is activated, in which, for example, the detection filter unit 52 as well as the modulation valuation unit 50 one of the evaluation unit 51 is trained for a new type of drop. Here, the relative permitted fluctuation ranges of the compared values in relation to the reference values, the acquisition time window of the values relevant for the detection filter unit 52 as well as the absolute value ranges of the reference values are determined. This software training mode is carried out, for example, when a new test series is pending, meaning a different sort of drop should be detected.

In FIG. 6, a flowchart is shown with which a method 500 of detecting a drop of a metering valve DV is illustrated. At step 6.I, a pulsed carrier signal TS is generated with a defined pulse frequency or carrier frequency and a defined duty cycle.

At step 6.II, a modulated measurement signal MS is generated by a physical interaction of the carrier signal TS with a drop TR to be detected, which has been dispensed by the metering valve DV. To be specific, at sub-step 6.IIa, the carrier signal TS is initially converted into a light signal LS by a light-emission unit. During a sub-step 6.IIb, the light beam LS pulsed with a carrier frequency is coupled into a first light-guiding element L1. Then, the pulsed light beam LS at step 6.IIc is emitted by the first light-guiding element L1 in such a way that it runs through an intermediate space ZR between the first light-guiding element L1 and a second light-guiding element L2, crosses a trajectory of the drop TR, which runs through the intermediate space ZR between the first light-guiding element L1 and the second light-guiding element L2, and then—possibly comprising a modulated light signal—is coupled into the second light-guiding element L2. At step 6.IId, the possible light beam LS comprising a modulated light signal MS is converted into a possibly modulated electrical measurement signal EMS by a light conversion unit, for example, a light sensor.

At step 6.II, a modulation signal MOD is determined based on the possibly modulated electrical measurement signal EMS. The modulation signal MOD corresponds to the information, which is formed via a change in the light beam when a drop TR collides with the light beam LS. Then, at step 6.IV, based on the modulation signal MOD, it is determined if a drop TR is distributed by the metering valve.

In FIG. 7, the functional principle 700 of the modulation valuation unit 51 of an evaluation unit 50 shown in FIG. 3 is illustrated in detail. At step 7.I, the modulation valuation unit 51 records in-phase and quadrature components I, Q from the inputs 53, 54 shown in FIG. 3 of the A-D converters connected downstream to the control means 60 of the evaluation unit 50. The sampling of the in-phase signal I and the quadrature signal Q takes place on a continual basis. Thereby, both values I, Q are preferably acquired at the same time. Before being further processed, the values I, Q go through a median filter in order to remove extreme values caused by irradiation interference, ADC conversion errors, etc. At step 7.III, the signal components I, Q are converted into a signal MOD(A, φ) by means of a polar-coordinate transformation process, which comprises information concerning the amplitude A and the phase φ of the modulation signal MOD. For example, A the amplitude is as follows:

$$A = \sqrt{I^2 + Q^2}. \tag{1}$$

Furthermore, the phase φ of the modulation signal MOD results from the following equation:

$$\varphi = \arctan\left(\frac{Q}{I}\right). \tag{2}$$

While I and Q correspond to the amplitudes of the in-phase and quadrature components I, Q of the demodulated signal or the modulation signal MOD. The amplitude A and the phase φ are time-dependent factors like the signal components I and Q. Due to the high sampling rate and fast value acquisition associated therewith, the calculations according to equation 1 and 2 are calculated via look-up tables with linear intermediate value interpolation.

At step 7.III, a time derivation of the amplitude A and the phase φ of the modulation signal MOD(A, φ) occurs. At step 7.IV, derivative values dA/dt, dφ/dt are observed at a predetermined time interval $I_T$ and a number of maximum values max(dA/dt), max(dφ/dt) of the derivative values dA/dt, dφ/dt determined in advance are selected at a predetermined time interval $I_T$, for example, the largest 10 values. The predetermined time interval $I_T$ can, for example, be determined in advance when initialising the drop-detection device and during the detection filter training. At step 7.V, modulation values $A_M$, $\varphi_M$ are shown for the amplitude A and phase φ as a sum of the predetermined number of maximum values.

FIG. 8, the functional principle 800 of the detection filter unit 52 of the evaluation unit 50 shown in FIG. 3 is illustrated in detail. At step 8.I, modulation values $A_M$, $\varphi_M$ for the amplitude A and the phase φ determined by the modulation valuation unit 51 according to the method shown in FIG. 7, also known comparative values, are received. At step 8.II, these comparative values $A_M$, $\varphi_M$ are saved in an electronic storage system. Furthermore, at step 8.III, the save comparative values are used to calculate reference values. The reference values $RW_A$, $RW_\varphi$ for the amplitude A and the phase φ are determined. These reference values of $RW_A$, $RW_\varphi$ can be, for example, average values from older amplitude and phase values, i.e. comparison values obtained, for example, during an earlier detection of drops.

At step 8.IV, a deviation AW of the modulation values $A_M$, $\varphi_M$ for the amplitude A and the phase φ determined by the modulation valuation unit 51 from the reference values $RW_A$, $RW_\varphi$ are calculated. Then, at step 8.V, a comparison between the respectively determined deviation AW and the maximum the permitted relevant deviation upwards AW_up or downwards AW_down takes place. If the deviation is too great, which is marked with a "j" in FIG. 8, a notification is made at step 8.VI that an faulty drop has been detected. The extent of permitted deviation AW_up or AW_down is determined using one or a plurality of target drops during an initialisation procedure or in the aforementioned software training mode of the drop-detection device.

In order to be able to recognise a gradual error, for example the phenomenon that the size of the drop TR to be detected during a frequently repeated emission of drops from a metering valve DV changes very slowly, the reference values $RW_A$, $RW_\varphi$, meaning, for example, the average values of modulation values $A_M$, $\varphi_M$ from past drops, are also monitored. At step 8.VII, it is determined if the reference values $RW_A$, $RW_\varphi$ for amplitude A and phase φ are within a predetermined absolute value range ARI, PRI. If the reference values $RW_A$, $RW_\varphi$ are not within a predetermined value range ARI, PRI, which is marked with an "n" in FIG. 8, a notification is given at step 8.VIII that only a series of faulty drops is present. The resolution to this error only occurs after stabilizing the average value, meaning when a valid reference value of the past drops is present again. If the reference values $RW_A$, $RW_\varphi$ are not within a predetermined value range ARI, PRI and the relation of the values $A_M$, $\varphi_M$, of the current drops to the reference values $RW_A$, $RW_\varphi$ is within the tolerated relative range, which is marked with a "j" in FIG. 8, a notification is given at step 9.IX that a correct drop has been detected. The output of the results can occur, for example, via the control light indicators 58, 59 shown in FIG. 5.

In conclusion, it is again pointed out that in the case of the apparatuses described above in detail, these only have to do with exemplary embodiments, which can be modified by the person skilled in the art in various ways without leaving the realm of the invention. Still, the use of the indefinite article "a" or "an" does not rule out that several relevant features can also be available. As well, the term "unit" should comprise components that consist of a plurality, if applicable, also spatially separate subunits. In addition, with the term "unit", a conceptual logical unit can be meant, meaning that the same hardware component can comprise a plurality of these logical units. This also particularly applies, for example, to the demodulation unit 40 and, if applicable, also to the signal-generation unit 20 and the evaluation unit 50.

REFERENCE LIST 11, 11a Drop-detection device
14 Emission window
15 Detection window
20 Signal-generation unit
21 Transmission signal-generation unit
22 Control signal output
23 Second signal-generation unit
24 Power amplifier
30 Modulation unit
31 Light-emission unit/light-emitting diode
32 Light sensor
40 Demodulation unit
41 Amplifier unit
42 Filter unit
43 Mixer/mixer unit
44 In-phase signal amplifier
45 Quadrature signal amplifier
50 Evaluation unit
51 Modulation valuation unit
52 Detection filter unit
53, 54 Inputs
56, . . . , 59 Indicator lights
60 Control unit
70 Light-signal generation device
80 Light evaluation device
431 Transmitter
432 Switch unit

432a, 432, 432c, 432d Switches connected in parallel
433 Integrator unit
433a, 433b, 433c, 433d Integrators
434a, 434b Differential amplifiers
A Amplitude
$A_M$ Amplitude modulation value
ARI Predefined value range of the amplitude reference values
AW Deviation
AW_up Relative deviation upwards
AW_down Relative deviation downwards
$b_a$ Active width
dA/dt Time variation of the amplitude
dφ/dt Phase derivation value
DEM Nozzle adjustment nut
DS Distance spacers
DV Metering valve
EMS Modulated electrical measurement signal
$h_a$ Active light-guiding element height
I In-phase signal/in-phase component
$I_T$ Predefined time interval
I/O Communication interface
L light-guiding element arrangement
LH Light-guide element mount
LS Light beam/light signal
L1 First light-guiding element
L2 Light-guiding element
LS Pulsed light beam
MOD Modulation signal
MOD(A, φ) Modulation signal in polar coordinates
LS Modulated light signal
PGM Programming socket for transferring firmware
PRI Predetermined value range of the phase reference values
PWM_1, ..., PWM_4 Phase-shifted pulsed carrier signals
PWM_5 Transmission signal
Q Quadrature signal/quadrature component
R Resistor
RX Input
$RW_A$ Amplitude reference value for the amplitude
$RW_φ$ Phase reference value
S1, S2 Pressure switch
SI Serial interface
T Trajectory
$T_{PWM}$ Period of the carrier signal
TR Drop
TS Pulsed light/carrier signal
TX Output
$U_S$ Input for power supply of the control unit
ZR Intermediate space
φ Phase
$φ_M$ Phase modulation value

The invention claimed is:

1. A drop-detection device comprising:
    a light-guiding element arrangement with a first light-guiding element and a second light-guiding element, which are located opposite to each other at an intermediate space, through which, the trajectory of the drop passes, in such a way that a light beam guided by the first light-guiding element crosses the trajectory of the drop and is subsequently coupled into the second light-guiding element arrangement so that drops escaping from a nozzle of a metering valve moving along a trajectory may be detected for application of a defined amount of a metering medium over a distance without any contact to the component to be processed,
    a light-signal generation device in order to couple a pulsed light beam with a carrier signal with a carrier frequency into the first light-guiding element, and
    a light evaluation device in order to evaluate the light beam coupled into the second light-guiding element in order to determine if a drop has been dispensed by the metering valve based on a modulation of the carrier signal by the drop.

2. The drop-detection device according to claim 1, wherein
    the first light-guiding element as a first and a second end and the first end of the first light-guiding element is coupled with a light-emission device of the light-signal generation device and the second end of the first light-guiding element forms an emission window to the intermediate space to be monitored, and
    the second light-guiding element has a first and a second end and the first end of the second light-guiding element forms an detection window to the intermediate space to be monitored and the second end of the second light-guiding element is coupled with a sensor device of the light evaluation device.

3. The drop-detection device according to claim 1, wherein the light-guiding elements are arranged at the metering valve in such a way that the pulsed light beam from the first light-guiding element hits the drop directly, is then modulated by the drop and directly coupled into the second light-guiding element.

4. The drop-detection device according to claim 1, wherein the first light-guiding element and the second light-guiding element comprise plastic fibres.

5. The drop-detection device according to claim 1, wherein the light-guiding elements are positioned relative to the metering valve in such a way that a defined effective cross-section surface of the first and/or second light-guiding element results depending on the respective metering process, in particular depending on a drop size to be expected.

6. The drop-detection device according to claim 1, wherein the light evaluation unit is configured to determine if a drop has been dispensed by the metering valve taking a defined carrier frequency of the pulsed light into account.

7. The drop-detection device according to claim 1 with a demodulation unit that is configured to carry out an amplitude modulation or a quadrature modulation of a captured modulated measurement signal based on the pulsed light.

8. The drop-detection device according to claim 1, wherein the light evaluation device comprises a modulation valuation unit, which is configured, preferably based upon an in-phase component and a quadrature component, to determine the amount of amplitude and/or the phase of the modulation signal based on the modulated measurement signal.

9. The drop-detection device according to claim 1, wherein the light-emission device is configured to convert a pulsed electrical signal into a light wave without changing the carrier frequency and phase of the pulsed signal.

10. The drop-detection device according to claim 1, wherein the light-signal generation device is designed in such a way that the brightness of the pulsed light beam is set via the selection of a pulse width of light pulses of the pulsed light beam.

11. A method of detecting a drop, which escapes from a metering valve, wherein a pulsed light beam with a carrier frequency is guided from a first light-guiding element in such a way that it passes through an intermediate space between the first light-guiding element and a second light-guiding element, and thereby crosses a trajectory of the drop, which passes between the intermediate space between the first light-guiding element and the second light-guiding element, and then is coupled into a second light-guiding element, and, on the basis of a modulation of the carrier signal by the drop of the light beam coupled into the second light-guiding element, it is determined if a drop has been dispensed by the metering valve such that there is application of a defined amount of a metering medium over a distance without any contact to the component to be processed.

* * * * *